(12) United States Patent
Boersma et al.

(10) Patent No.: US 10,545,727 B2
(45) Date of Patent: Jan. 28, 2020

(54) ARITHMETIC LOGIC UNIT FOR SINGLE-CYCLE FUSION OPERATIONS

(71) Applicant: International Business Machines Corporation, Armonk, NY (US)

(72) Inventors: Maarten J. Boersma, Holzgerlingen (DE); Niels Fricke, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 53 days.

(21) Appl. No.: 15/864,371

(22) Filed: Jan. 8, 2018

(65) Prior Publication Data
US 2019/0212984 A1 Jul. 11, 2019

(51) Int. Cl.
*G06F 7/57* (2006.01)
*G06F 7/506* (2006.01)

(52) U.S. Cl.
CPC .......... *G06F 7/57* (2013.01); *G06F 7/506* (2013.01); *G06F 2207/506* (2013.01)

(58) Field of Classification Search
None
See application file for complete search history.

(56) References Cited

U.S. PATENT DOCUMENTS

| | | | |
|---|---|---|---|
| 7,188,134 B2 | 3/2007 | Mathew et al. | |
| 7,194,501 B2 | 3/2007 | Dubey et al. | |
| 7,827,226 B2 | 11/2010 | Jon | |
| 7,840,630 B2 | 11/2010 | Wong et al. | |
| 7,870,182 B2 | 1/2011 | Thendean et al. | |
| 8,073,891 B2 | 12/2011 | Bernard et al. | |
| 8,612,500 B2 | 12/2013 | Haller et al. | |
| 8,627,248 B1 | 1/2014 | Shao et al. | |
| 9,311,050 B2 | 4/2016 | Olsen | |
| 9,311,103 B2 | 4/2016 | Smith | |
| 9,448,766 B2 | 9/2016 | Bergland et al. | |
| 2008/0256165 A1 | 10/2008 | Krishnan | |

(Continued)

FOREIGN PATENT DOCUMENTS

WO 2016199157 A1 12/2016

OTHER PUBLICATIONS

Kumar et al.; "An Arithmetic and Logic Unit Optimized for Area and Power", International Journal and Magazine of Engineering, Technology, Management and Research, vol. 3, No. 2, Feb. 2016, pp. 340-345.

(Continued)

*Primary Examiner* — Michael D. Yaary
(74) *Attorney, Agent, or Firm* — Scully, Scott, Murphy & Presser, P.C.

(57) ABSTRACT

An arithmetic logic unit is disclosed that includes a first logical circuit that generates a first partial sum result from three operands in a first stage of a single clock cycle of a processor; a second circuit that generates a second partial result in the same first stage of the clock cycle of the processor; and an adder that receives the first partial result from the first logical circuit and the second partial result from the second circuit and generates a secondary result during a second stage of the single clock cycle of the processor. The arithmetic logic unit may optionally further include a backend circuit that performs additional arithmetic and logic functions in the same single clock cycle of the processor.

14 Claims, 9 Drawing Sheets

(56) References Cited

U.S. PATENT DOCUMENTS

2010/0235414 A1\* 9/2010 Huang .................... G06F 7/728
  708/207
2012/0280710 A1 11/2012 Stansfield et al.

OTHER PUBLICATIONS

Fang et al.; "8-bit Arithmetic Logic Unit Design Report", Dec. 9, 2007.
Swetha et al.; "An Efficient Design and Implementation of ALU Using Gated Diffusion Index", International Journal of Engineering and Computer Science ISSN:2319-7242, vol. 4 Issue 5 May 2015, p. 12210-12215.
Sultana et al.; "Reversible Architecture of Computer Arithmetic", International Journal of Computer Applications (0975-8887) vol. 93—No. 14, May 2014.
Office Action dated Oct. 11, 2019 received in U.S. Appl. No. 16/577,736, 18 pages.

\* cited by examiner

ARITHMETIC LOGIC UNIT FOR SINGLE-CYCLE FUSION OPERATIONS

BACKGROUND

The present invention relates to executions in a processor and more specifically to an arithmetic logic unit (ALU) that performs three-way operations in a single cycle to increase the efficiency of a processor.

Modern computer systems typically contain several integrated circuits (ICs), including a processor which may be used to process information in the computer system. The data processed by a processor may include computer instructions that are executed by the processor as well as data, which is manipulated by the processor using the computer instructions. The computer instructions and data are typically stored in a main memory in the computer system.

Processors typically run programs or processes by breaking them down into instructions and by executing the instructions in a series of small steps. In some cases, to increase the number of instructions being processed by the processor (and therefore increase the speed of the processor), the processor may be pipelined. Pipelining refers to providing separate stages in a processor where each stage performs one or more of the small steps necessary to execute an instruction, i.e., several instructions are overlapped in execution. In some cases, the pipeline (in addition to other circuitry) may be placed in a portion of the processor referred to as the processor core. Some processors may have multiple processor cores, and in some cases, each processor core may have multiple pipelines. Where a processor core has multiple pipelines, groups of instructions may be issued to the multiple pipelines in parallel and executed by each of the pipelines in parallel.

An arithmetic logic unit ("ALU") is one of the fundamental building blocks of a processor. The ALU is a circuit that performs a set of arithmetic and logic operations. These operations can be performed on one or more operands, e.g., binary words, received by the ALU. The operands, binary words, or values are strings of zeros and ones that may be n-bit long. For example, the operands may be 8, 16, 32, or 64 bits to name just a few examples. The ALU may add or subtract one operand from another operand to obtain a result. The ALU may also execute multiplication and division operations. Arithmetic operations are performed by an arithmetic circuit in the ALU. Typically, the arithmetic circuit includes an adder, which may include, a number of full adder circuits configured in a cascade. Adder circuits are a plurality of logic gates and electronic components arranged to perform an arithmetic operation. A number of adder circuits have been developed by configuring a plurality of logic gates, including, for example, parallel prefix adders (Ladner-Fisher adder, Kogge-Stone adder, Brent-Kung adder, Han-Carlson adder), ripple carry adders, carry look-ahead adders, block-carry look ahead adders, conditional sum adders, carry select adders, carry skip adders, and carry save adders. The operations performed by the adder can be selected by controlling the inputs of the adder. These control signals or inputs can instruct the arithmetic circuit to perform a specified operation (e.g., addition, subtraction, increment or decrement). The ALU may also include a multiplier circuit for executing operations such as, for example, multiplication and division. Again, the control signals or inputs can instruct the arithmetic circuit to perform a specified operation (multiplication, division, etc.).

The ALU may also subject one or more operands to logic functions such as AND, OR, XOR (i.e., Exclusive OR), and NOT logic functions. Other logic functions such as NAND (i.e., not AND), NOR (i.e., not OR), and XNOR (i.e., exclusive not OR) can also be performed by the logic circuit. Logic functions and operations performed by the logic circuit in the ALU may be based upon one or more control inputs. These control signals or inputs may be used by and common to both the logic and arithmetic circuits.

In processors, the speed at which operations are performed by the ALU is usually limited by the arithmetic circuit. The speed of the ALU and the processor may be limited by the adder circuitry of the arithmetic circuit. One way to boost single thread execution performance of a processor core is called fusion. Fusion refers to the ability of the processor to fuse pairs of instructions and execute them together as if they would only be one instruction, thus doubling the instruction execution bandwidth, which in turn increases application performance. It may be beneficial to design an ALU that can fuse instructions in order to execute two instructions on three operands in a single cycle of the ALU. It may be beneficial if the design and architecture of the ALU did not require a significant increase in the area required on the semi-conductor chip by the logic circuits to implement such a three-way ALU (e.g., capable of performing arithmetic operations and logic functions on three operands in a single cycle), or result in an overall delay of the ALU lowering the maximum frequency at which the ALU can operate.

SUMMARY OF THE INVENTION

The summary of the disclosure is given to aid understanding of the system, architectural structure and method of operation of the processor, including the ALU of the processor, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the memory systems, architectural structure and method of operation to achieve different effects.

The present invention generally provides improved arithmetic logic unit (ALU) that performs faster, more efficiently, and with less delay than previous arithmetic logic units, and in one embodiment can perform three way operations in a single clock cycle of a processor to increase efficiency and speed of the processor. In one embodiment, the ALU may execute two arithmetic operations or logic functions on three binary word operands in a single cycle of a processor. An arithmetic logic unit is disclosed that includes a first logical circuit that generates a first partial sum result from three operands in a first stage of a single clock cycle of a processor; a second circuit that generates a second partial result in the first stage of the clock cycle of the processor; and an adder that receives the first partial result from the first logical circuit and the second partial result from the second circuit and generates a secondary result during a second stage of the single clock cycle of the processor.

In another embodiment an arithmetic logic unit for executing arithmetic operations on three binary operands in a single stage of a cycle of a processor is disclosed, the arithmetic logic unit comprising a first logic circuit for generating a first partial result in a first stage of a single clock cycle of a processor, the first logic circuit having a first part to receive two operands and having a second part to receive a third operand; a second logic circuit for generating a second partial result in the first stage of the same single clock cycle of the processor as the first logic circuit, the second logic circuit having a first part to generate a carry-in result for an addition operation and a second part to select a second part result that is a function of at least one of the operands, wherein the second partial result is at least one of the group consisting of the carry-in result and the second part result; an adder configured to receive the first partial result from the first logic circuit and the second partial result from the second logic circuit, and further configured to generate a secondary result during a second stage of the same single cycle that the first logic circuit and the second logic circuit generate the first partial result and the second partial result, respectively; and a backend circuit for generating a final result, wherein the backend circuit performs additional operations on the secondary result in a third stage of the same single cycle of the processor.

A method of performing arithmetic operations and/or logic functions in a computer processor is also disclosed, where the method includes inputting three operands into a first logical circuit; generating a first partial result in the first logical circuit in a first stage of a first cycle of the processor; generating a second partial result in a second circuit in the first stage of the first cycle of the processor; and generating a secondary result from the first partial result and the carry result during a second stage of the first cycle of the processor, wherein the secondary result is an arithmetic operation or logical function of the three operands.

BRIEF DESCRIPTION OF THE DRAWINGS

The various aspects, features and embodiments of the processor system, architectural structure and its method of operation will be better understood when read in conjunction with the figures provided. Embodiments are provided in the figures for the purpose of illustrating aspects, features and/or various embodiments of the ALU system, architectural structure and method of operation, but the claims should not be limited to the precise arrangement, structures, features, aspects, embodiments or devices shown, and the arrangements, structures, subassemblies, features, aspects, embodiments, methods, and devices shown may be used singularly or in combination with other arrangements, structures, subassemblies, features, aspects, embodiments, methods and devices.

DETAILED DESCRIPTION

The following description is made for illustrating the general principles of the invention and is not meant to limit the inventive concepts claimed herein. In the following detailed description, numerous details are set forth in order to provide an understanding of the processor system, architectural structure and method of operation, however, it will be understood by those skilled in the art that different and numerous embodiments of the processor system, architectural structure and method of operation may be practiced without those specific details, and the claims and invention should not be limited to the embodiments, subassemblies, features, processes, methods, aspects, features of details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified.

Figure 1:
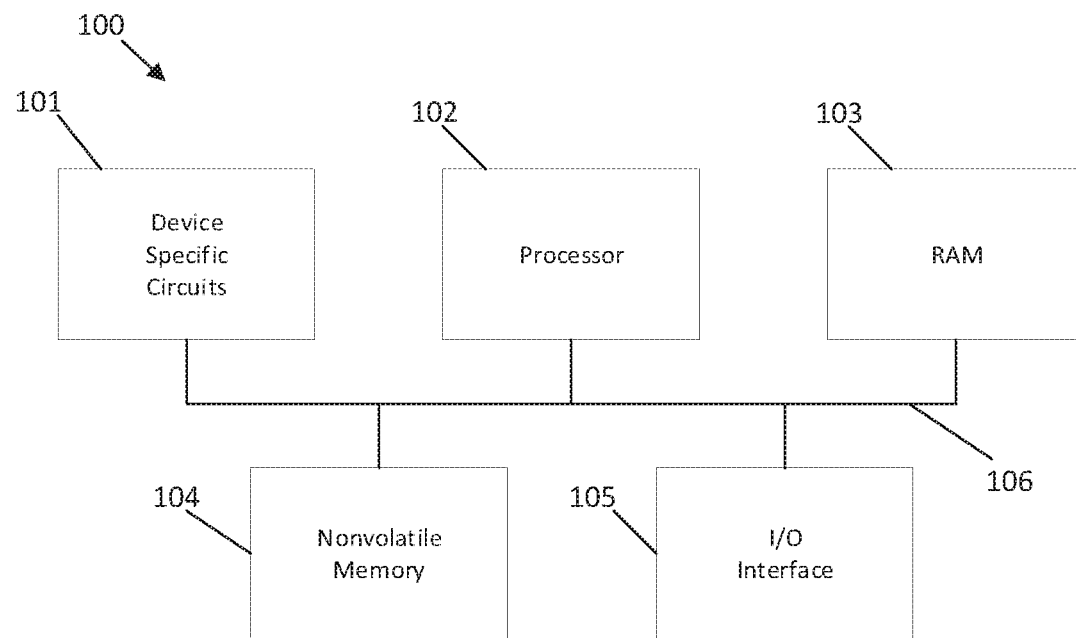
FIG. 1 depicts a general computing or data processing system in accordance with one embodiment.

A computing or data processing system 100 suitable for storing and/or executing program code may take many forms and in one embodiment may include at least one processor 102, which may be or be part of a controller, coupled directly or indirectly to memory devices or elements through a system bus 106, as shown in FIG. 1. Computing system 100 in FIG. 1 is shown with a processor 102, Random Access Memory (RAM) 103, nonvolatile memory 104, device specific circuits 101, and I/O interface 105. Alternatively, the RAM 103 and/or nonvolatile memory 104 may be contained in the processor 102 as could the device specific circuits 101 and I/O interface 105. The processor 102 may comprise, for example, an off-the-shelf microprocessor, custom processor, Field Programmable Gate Array (FPGA), Application Specific Integrated Circuit (ASIC), discrete logic, etc., or generally any device for executing instructions. The RAM 103 is typically used to hold variable data, stack data, executable instructions, etc., and may include Dynamic Random Access Memory or DRAM.

According to various approaches, the nonvolatile memory 104 may comprise any type of nonvolatile memory such as, but not limited to, Electrically Erasable Programmable Read Only Memory (EEPROM), flash Programmable Read Only Memory (PROM), battery backup RAM, hard disk drives, etc. The nonvolatile memory 104 is typically used to hold the executable firmware and any nonvolatile data containing programming instructions that can be executed to cause the processor 102 to perform certain functions.

In some embodiments, the I/O interface 105 may include a communication interface that allows the processor 102 to communicate with devices external to the controller. Examples of the communication interface may comprise, but are not limited to, serial interfaces such as RS-232, USB (Universal Serial Bus), Small Computer Systems Interface (SCSI), RS-422 or a wireless communication interface such as Wi-Fi, Bluetooth, near-field communication (NFC) or other wireless interfaces. The computing system 100 may communicate with an external device via the communication interface 105 in any communication protocol such as Automation/Drive Interface (ADI).

Figure 2:
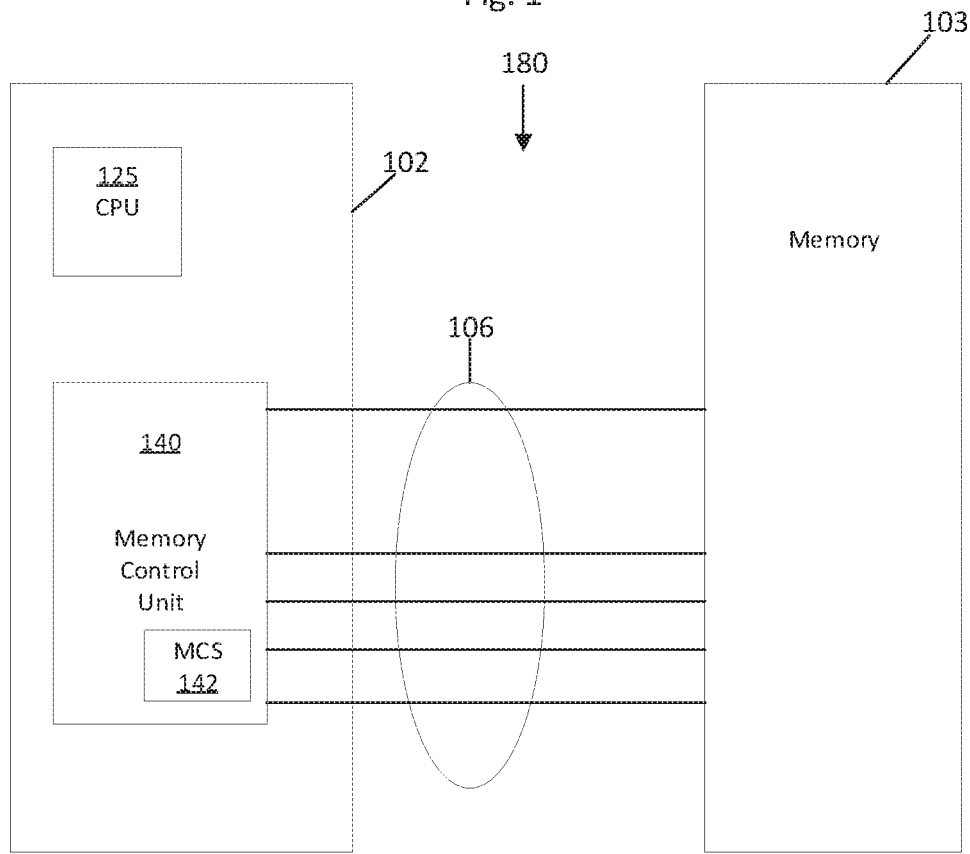
FIG. 2 depicts a processor and memory system according to one embodiment.

FIG. 2 depicts an exemplary processing system 180 that may be part of a larger computer system structure or network. The processing system 180 includes a control processor system or processor 102, which is a processing subsystem that includes at least one processor unit (CPU) or microprocessor 125 that may be configured to interface with a Memory Control Unit (MCU) 140. The processor or CPU 125 may be a module that processes read, write, and configuration requests from a system controller (not depicted). The processor 125 may be a multi-core processor. The MCU 140 may include a memory controller synchronous (MCS) 142, also referred to as a memory controller, that controls communication with one or more memory devices 150 (not shown in FIG. 2) in a memory subsystem 103. The MCU 140 and the MCS 142 may include one or more processing circuits, or processing may be performed by or in conjunction with the processor 125. The control processor system 102 communicates with the memory subsystem 103 through a communications bus 106.

Figure 3:
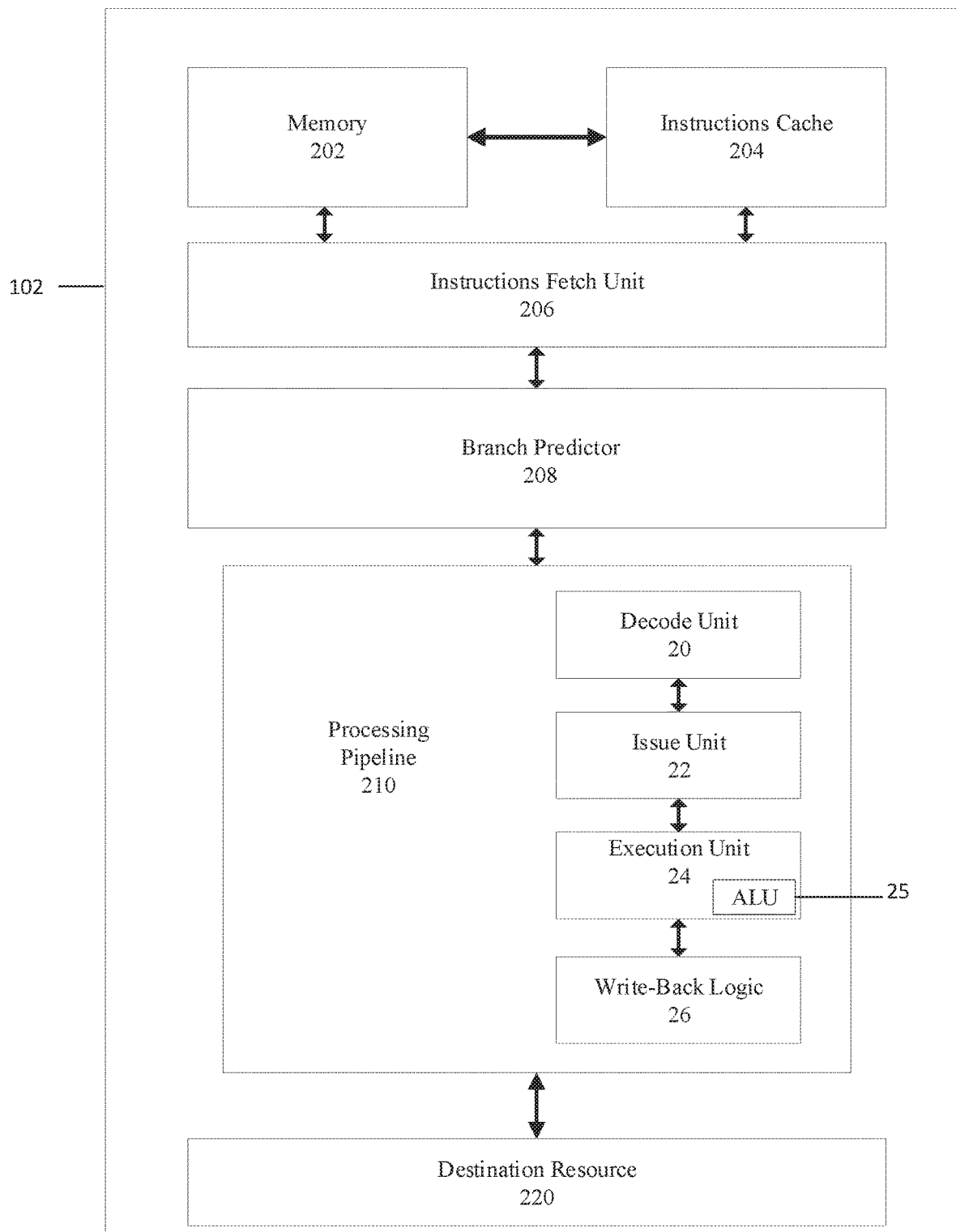
FIG. 3 depicts a block diagram of a processor in accordance with an embodiment.

FIG. 3 depicts a block diagram of a processor 102 according to an embodiment. The processor 102 may include a memory 202, an instruction cache 204, an instruction fetch unit 206, a branch predictor 208, and a processing pipeline 210. The processor 102 may be included within a computer processor or otherwise distributed within a computer system. Instructions and data can be stored in memory 202, and the instruction cache 204 may access instructions in memory 202 and store the instructions to be fetched. The memory 202 may include any type of volatile or nonvolatile memory, such as cache memory. The memory 202 and instruction cache 204 can include multiple cache levels. A data cache (not depicted) may also be included in the processor 102. In one embodiment, instruction cache 204 may be configured to store up to 32 kilobytes of instructions in an 8-way set associative structure. Alternatively, any other desired configuration and size may be employed. For example, instruction cache 204 may be implemented as a fully associative, set associative, or direct mapped configuration.

In FIG. 3, a simplified example of the instruction fetch unit 206 and the processing pipeline 210 are depicted. In various embodiments, the processor 102 may include multiple processing pipelines 210 and instruction fetch units 206. In an embodiment, the processing pipeline 210 includes a decode unit 20, an issue unit 22, an execution unit 24, and write-back logic 26. The instruction fetch unit 206 and/or the branch predictor 208 may also be part of the processing pipeline 210. The processing pipeline 210 may also include other features, such as error checking and handling logic, reorder buffer, one or more parallel paths through the processing pipeline 210, and other features now or hereafter known in the art. While a forward path through the processor 102 is depicted in FIG. 3, other feedback and signaling paths may be included between elements of the processor 102.

The instruction fetch unit 206 fetches instructions from the instruction cache 204 according to an instruction address, for further processing by the decode unit 20. The decode unit 20 decodes instructions and passes the decoded instructions, portions of instructions, or other decoded data to the issue unit 22. The decode unit 20 may also detect branch instructions which were not predicted by branch predictor 208. The issue unit 22 analyzes the instructions or other data and transmits the decoded instructions, portions of instructions, or other data to one or more execution units in the execution unit 24 based on the analysis. The execution unit 24 executes the instructions. The execution unit 24 may include a plurality of execution units, such as Arithmetic Logic Units (ALUs) 25, fixed-point execution units, floating-point execution units, load/store execution units, vector multimedia execution units. The write-back logic 26 writes results of instruction execution back to a destination resource 220. The destination resource 220 may be any type of resource, including registers, cache memory, other memory, I/O circuitry to communicate with other devices, other processing circuits, or any other type of destination for executed instructions or data.

Figure 4:
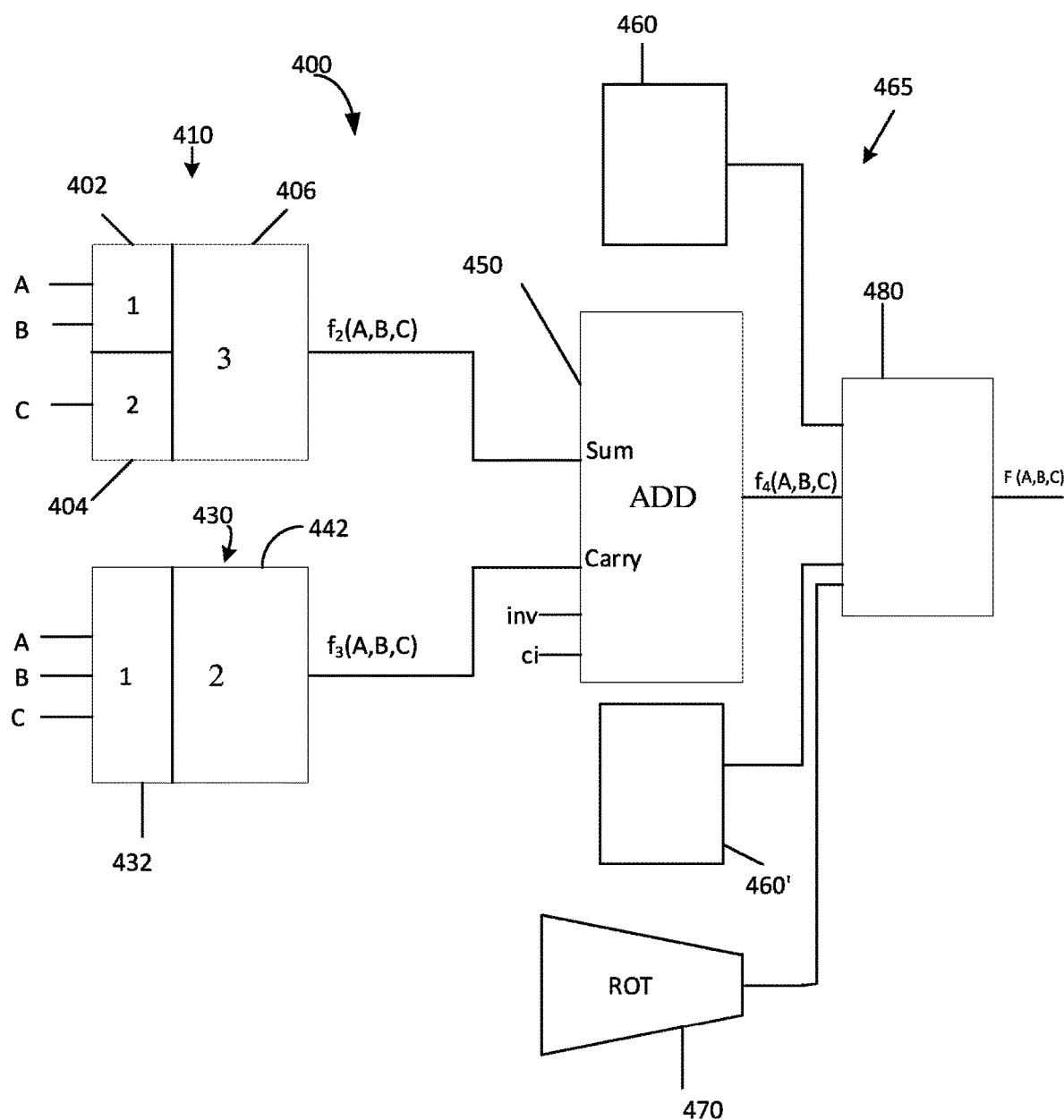
FIG. 4 depicts a block diagram of an arithmetic logic unit (ALU) according to one embodiment.

FIG. 4 illustrate a block diagram of an arithmetic logic unit (ALU) circuit 400 that may be part of or contained within a processor. ALU 400 includes a first logical circuit 410, a second circuit 430, and an adder circuit or adder 450. ALU 400 may further optionally include a backend circuit 465, which may include two operand circuits 460, 460', a rotator 470 and a fusion circuit 480. ALU 400 can perform a number of arithmetic operations and logic functions as will be explained in further detail below. ALU 400 preferably executes and performs multiple arithmetic operations and/or logic functions in a single cycle and preferably using three operand inputs. The operands may be any number of bits long, including, for example, 4, 8, 16, 32, 64, 72 or 80 bits long to name just a few examples. The ALU 400 can perform multiple arithmetic operations and/or logic functions on one, two, or three operands in a single cycle. These and other benefits of ALU 400 will become evident from the further description herein.

Figure 5:
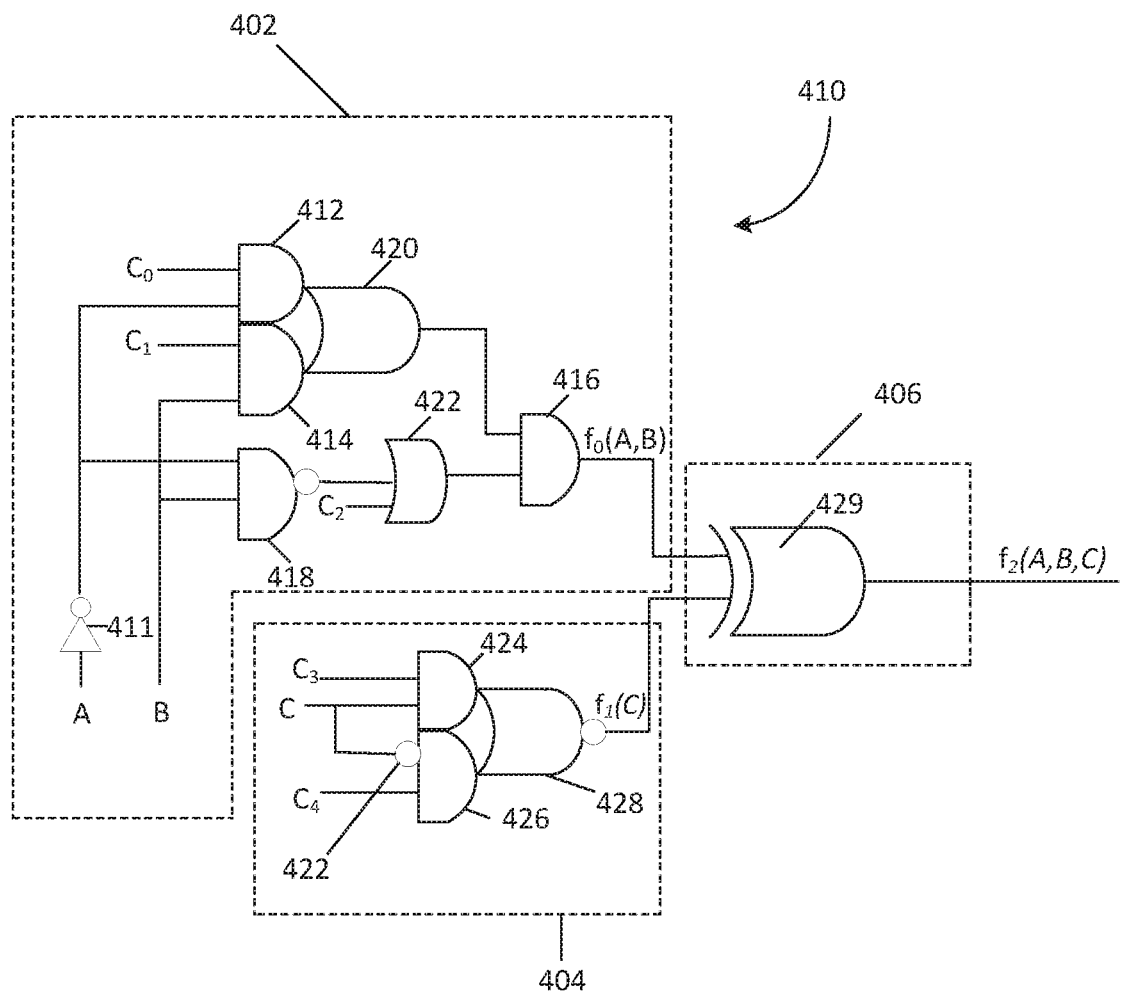
FIG. 5 depicts a schematic diagram of a first logical circuit according to one embodiment in an ALU.

FIG. 5 illustrates a schematic diagram of one embodiment of first logical circuit 410. First logical circuit 410 generates or outputs partial result $f_2(A,B,C)$ from three operands (e.g., A,B,C) in a first stage of a single clock cycle of a processor containing ALU 400. First logical circuit 410 comprises five control inputs $C_0$, $C_1$, $C_2$, $C_3$ and $C_4$ to control its output (e.g., the partial result), which is a function of the three operands, A, B, C, that are the operand inputs to the first logical circuit 410. First logic circuit 410 comprises in one embodiment a plurality of logic gates including two inverters, five AND gates, two OR gates, one NAND gate, one NOR gate and one Exclusive OR (XOR) gate.

For ease of description first logical circuit 410 may include a first part 402, a second part 404, and a third part 406 as shown in FIGS. 4 and 5. The first part 402 of the first logical circuit 410 includes a plurality of logic gates, two operand inputs, and three control inputs to generate an output $f_0(A,B)$ which is an arithmetic sum or logical which is a function of the two operands A, B. The output $f_0(A,B)$ of the first part 402 of the first logical circuit 410 forms an input to the third part 406 of the first logical circuit 410.

The first part 402 of the first logical circuit 410 includes one inverter 411, three AND gates 412, 414, 416, one NAND gate 418, and two OR gates 420, 422. The outputs of the first and second AND gates 412, 414 are the two inputs to the first OR gate 420, and the output of the first OR gate 420 is the first input to the third AND gate 416. The output of the first NAND gate 418 is a first input to the second OR gate 422 and the output of the second OR gate 422 is the second input to the third AND gate 416.

A first control input $C_0$ is a first input to first AND gate 412, a second control input $C_1$ is a first input to second AND gate 414, and a third control input $C_2$ is the second input to the second OR gate 422. Two operands, e.g., A, B, are input into first part 402 of first logical circuit 410. First operand A is input to inverter 411, the output of inverter 411 is coupled as a second input to first, AND gate 412 and the first input to NAND gate 418. The second operand B is coupled as the second input to the second AND gate 414 and the second input to the NAND gate 418. It can be appreciated that the first and second operand A, B inputs can be swapped.

By controlling the three control inputs $C_0$, $C_1$ and $C_2$, various arithmetic operations and logical functions of operand A and operand B may be obtained. Table 1 below is a chart that shows the output or result $f_0(A,B)$ for the first part 402 of the first logical circuit 410 as the control inputs $C_0$, $C_1$, $C_2$ are varied. The key to the output functions of the various circuits described herein is included below as table 2.

TABLE 1

| Control Inputs | | | Output |
|---|---|---|---|
| $C_2$ | $C_1$ | $C_0$ | $f_0$ (A, B) |
| 0 | 0 | 0 | 0 |
| 0 | 0 | 1 | not (A \| B) |
| 0 | 1 | 0 | A & B |
| 0 | 1 | 1 | not (A ^ B) |
| 1 | 0 | 0 | 0 |
| 1 | 0 | 1 | not A |
| 1 | 1 | 0 | B |
| 1 | 1 | 1 | (not A) \| B |

TABLE 2

| KEY | |
|---|---|
| Symbol | Meaning |
| Not | logical inversion |
| & | logical AND |
| \| | logical OR |
| ^ | Logical XOR |
| + | binary add |
| − | binary subtract |
| 0 | Integer 0 (all bits of a binary number are equal to zero). |
| −1 | Integer minus one (all bits of a binary number are equal to 1) |
| 1 | Integer one (only the least significant bit in binary number is a 1 while all the others are zero (0) |

Second part 404 of first logical circuit 410 includes a plurality of logic gates, one operand input (e.g., third operand C) and two control inputs $C_3$, $C_4$ to generate an output $f_1(C)$ which is a function of C, an integer minus 1 (−1) (all bits of a binary number are equal to 1), or an integer 0 (all bits of a binary number are equal to zero). The output $f_1(C)$ of the second part 404 of the first logical circuit forms the second input to the third part 406 of the first logical circuit 410.

The second part 404 of the first logical circuit 410 includes in one embodiment an inverter 422, two AND gates 424, 426 and a NOR gate 428. The outputs of the fourth and fifth AND gates 424, 426 respectively are the two inputs to the NOR gate 428, and the output $f_1(c)$ of the NOR gate 428 is the second input to the third part 406 of the first logical circuit 410. Fourth control input $C_3$ and fifth control input $C_4$ are inputs to fourth and fifth AND gates 424, 426, respectively. Operand C is input to inverter 422 and the output of inverter 422 is the second input to fifth AND gate 426, and operand C is also the second input to fourth AND gate 424.

By controlling the fourth and fifth control inputs $C_3$, $C_4$, various logical functions and arithmetic operations of operand C may be obtained at the output $f_1(C)$ of the NOR gate 428. Table 3 below is a chart showing the output $f_1(C)$ for the second part 404 of first logical circuit 410 as the fourth and fifth control inputs $C_3$, $C_4$ are varied. While operands A, B were operand inputs to first part 402 of first logical circuit 410, and operand C was the operand input to the second part 404 of the first logical circuit 410 it can be appreciated that operand inputs A, B C may be swapped.

TABLE 3

| Control Inputs | | Output |
|---|---|---|
| $C_4$ | $C_3$ | $f_1$ (C) |
| 0 | 0 | −1 |
| 0 | 1 | not C |
| 1 | 0 | C |
| 1 | 1 | 0 |

Third part 406 of the first logical circuit includes Exclusive OR gate 429, also referred to as XOR gate 420. The output $f_2(A,B,C)$ of XOR gate 429 is one of the inputs to the adder circuit 450, and is the output of the first logical circuit 410. The output $f_2(A,B,C)$ is also referred to as a partial result. The input to XOR gate 429 includes the output $f_0(A,B)$ from the third AND gate 416 of the first part 402 of the first logical circuit 410 and the output $f_1(C)$ from the NOR gate 428 of the second part 404 of the first logical circuit 410. While third part 406 includes an Exclusive OR gate 429, it will be recognized that other circuit and logical gate combinations may be utilized. For example, the third part 406 may utilize an Exclusive NOR gate (ENOR) and invert one of the inputs.

By controlling the five control inputs $C_0$, $C_1$, $C_2$, $C_3$ and $C_4$ to the first logical circuit 410, various arithmetic operations and logic functions can be generated and output as a function of the three operand inputs (A, B, C.) Table 4 below is a chart showing the output (e.g., first partial result) $f_2(A,B,C)$ of first logical circuit 410 as the first, second, third, fourth and fifth control inputs, $C_0$, $C_1$, $C_2$, $C_3$, $C_4$, are varied.

TABLE 4

| Control Inputs | | | | | Output |
|---|---|---|---|---|---|
| $C_4$ | $C_3$ | $C_2$ | $C_1$ | $C_0$ | $f_2$ (A, B, C) = sum |
| 0 | 0 | 0 | 0 | 0 | −1 |
| 0 | 0 | 0 | 0 | 1 | A \| B |
| 0 | 0 | 0 | 1 | 0 | not (A & B) |
| 0 | 0 | 0 | 1 | 1 | A ^ B |
| 0 | 0 | 1 | 0 | 0 | −1 |
| 0 | 0 | 1 | 0 | 1 | A |
| 0 | 0 | 1 | 1 | 0 | not B |
| 0 | 0 | 1 | 1 | 1 | A & (not B) |
| 0 | 1 | 0 | 0 | 0 | not C |
| 0 | 1 | 0 | 0 | 1 | (A \| B) ^ C |
| 0 | 1 | 0 | 1 | 0 | not (A & B) ^ C |
| 0 | 1 | 0 | 1 | 1 | A ^ B ^ C |
| 0 | 1 | 1 | 0 | 0 | not C |
| 0 | 1 | 1 | 0 | 1 | A ^ C |
| 0 | 1 | 1 | 1 | 0 | not (B ^ C) |
| 0 | 1 | 1 | 1 | 1 | (A & (not B)) ^ C |
| 1 | 0 | 0 | 0 | 0 | C |
| 1 | 0 | 0 | 0 | 1 | not (A \| B) ^C |
| 1 | 0 | 0 | 1 | 0 | (A & B) ^ C |
| 1 | 0 | 0 | 1 | 1 | not (A ^ B ^ C) |
| 1 | 0 | 1 | 0 | 0 | C |
| 1 | 0 | 1 | 0 | 1 | not (A ^ C) |
| 1 | 0 | 1 | 1 | 0 | B ^ C |
| 1 | 0 | 1 | 1 | 1 | ((not A) \| B) ^ C |
| 1 | 1 | 0 | 0 | 0 | 0 |
| 1 | 1 | 0 | 0 | 1 | not (A \| B) |
| 1 | 1 | 0 | 1 | 0 | A & B |
| 1 | 1 | 0 | 1 | 1 | not (A ^ B) |
| 1 | 1 | 1 | 0 | 0 | 0 |
| 1 | 1 | 1 | 0 | 1 | not A |
| 1 | 1 | 1 | 1 | 0 | B |
| 1 | 1 | 1 | 1 | 1 | (not A) \| B |

The operations and calculations performed in first logical circuit 410 may be performed in a first stage of a single cycle in ALU 400. In one embodiment, the operations and calculations of the first logical circuit 410 may be completed in approximately 40 ps for sixty-four (64) bit operands. The first logical circuit can invert one operand for subtraction functions and can build a sum term for a three operand (3-way) add (3-way XOR, e.g., A^B^C). Other circuits and logical gate combinations that can build a sum term for a three operand add are envisioned for use as the first logical circuit to provide the appropriate input to the adder 450. Additionally, or alternatively, other circuits and logical gate combinations that can invert one of the operands for subtraction functions, and/or build a sum term for a three operand add are contemplated. In addition, circuits and logical gates that can provide the functionality and outputs substantially as shown in Table 4 (and/or tables 5A, 5B and 5C), preferably in a single stage of a single cycle of a processor, are contemplated for use as the first logical circuit. Tables 5A, 5B, 5C below are simplified charts showing the various arithmetic operations and logic functions generated (output $f_2(A,B,C)$) by the first logical circuit 410 for zero or one operand inputs (Table 5A), two operand inputs (Table 5B), and three operand inputs (Table 5C), as some of the outputs shown in table 4 are repetitive or not utilized for common ALU operations. Tables 5A, 5B and 5C are arranged and categorized by the number of operand inputs to the ALU during any cycle of the processor.

TABLE 5A

| 0/1 operands |
| --- |
| 0 |
| -1 |
| A |
| B |
| C |
| not A |
| not B |
| not C |

TABLE 5B

| 2 operands |
| --- |
| A \| B |
| A & B |
| A ^ B |
| not (A \| B) |
| not (A & B) |
| not (A ^ B) |
| A & (not B) |
| (not A) \| B |
| A ^ B |
| B ^ C |
| not (A ^ C) |
| not (B ^ C) |

TABLE 5C

| 3 operands |
| --- |
| (A \| B) ^ C |
| not (A & B) ^ C |
| A ^ B ^ C |
| (A & (not B)) ^ C |
| not (A \| B) \| C |
| (A & B) ^ C |
| not (A ^ B ^ C) |
| ((not A) \| B) ^ C |

Figure 6:
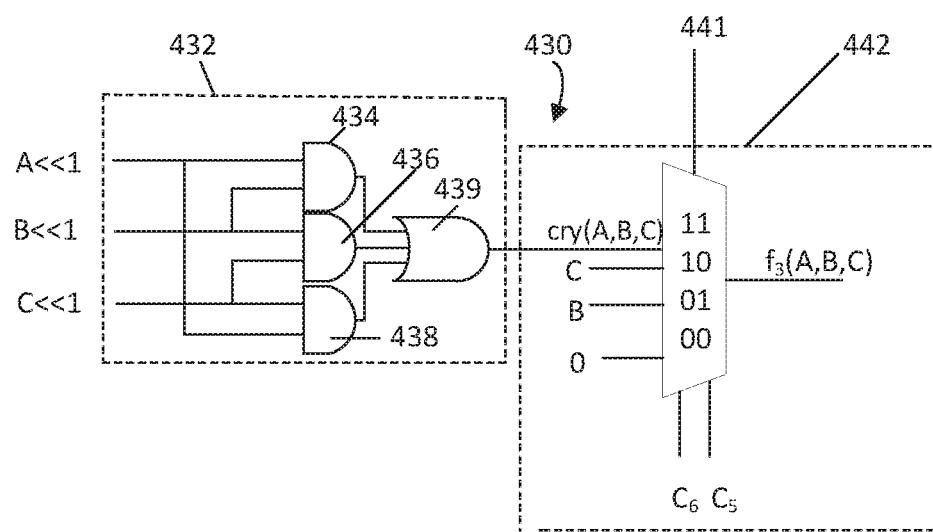
FIG. 6 depicts a schematic diagram of an embodiment of a second circuit according to an embodiment on an ALU.

FIG. 6 illustrates a schematic diagram for a second circuit 430 that generates a second partial result $f_3(A,B,C)$ preferably in a first stage of a single clock cycle of a processor containing ALU 400. The second partial result or output $f_3(A,B,C)$ of the second circuit 430 is a second input to adder 450. Output $f_3(A,B,C)$ is a function of the three input operands A,B,C, and in one aspect provides a second partial result, and in certain configurations a carry-in result, which may be utilized for an arithmetic addition operation, including a three operand addition operation. Second circuit 430 in one embodiment includes three AND gates, one three-input OR gate and a multiplexor. In addition to various forms of the three operands forming inputs to the second circuit 430, the second circuit 430 includes two or more control inputs depending upon the functions to be performed by the ALU 400.

For ease of description, second circuit 430 may include a first part 432, and a second part 442. The first part 432 of the second circuit 430 includes a plurality of logic gates and three inputs A<<1, B<<1, C<<1, which are operands A,B,C where all the bits are shifted one bit to the left. The first part 432 of the second circuit 430 in one embodiment includes three AND gates 434, 436, and 438 and one three-input OR gate 439. The outputs of each of the three AND gates 434, 436, 438 are the three inputs to the OR gate 439. The output cry(A,B,C) of the first part 432 of the second circuit 430 is a carry input to the second part 442 of the second circuit 430. The inputs to the three AND gates 434, 436, 438 are functions of the operands A,B,C, and are the operands A,B,C where all the bits of the operand are shifted one place (one bit) to the left. Operand A<<1 is one input to both AND gates 434, 438; Operand B<<1 is one input to both AND gates 434, 436, and operand C<<1 is one input to both AND gates 436, 438. The function of first part 432 of second circuit 430 is to calculate a carry as one possible input to the adder 450 for use in an addition operation as will be explained below.

The second part 442 of the second circuit 430 includes a multiplexor 441. Multiplexor 441 may take many forms depending upon the operations and functions to be performed by the ALU 400. The output $f_3(A,B,C)$ of the multiplexor 441 is the output of the second part 442 of the circuit 430. The output of the multiplexor 441 is also the output of the second circuit 430, which constitutes one of the inputs to the adder 450. In one embodiment, the multiplexor 441 in the second part 442 of the second circuit 430 optionally may be a 4:1 multiplexor, which may have four inputs, two control signals, and one output. The inputs to multiplexor 441 may include the cry(A,B,C), the operand C, the operand B, or a zero (0). There may be additional inputs and controls to the multiplexor 441, or to the second circuit 430, such as, for example, an operand with all its bits shifted three places (bits) to the left, and/or an operand with all of its bits shifted six places (bits) to the left. While second circuit 430 shows a certain combination of circuits and logic gates to create a carry for the first part 432 of the second circuit 430, and a multiplexor in the second part 442 of the second circuit 430 to output a 0, B, C or cry(A,B,C), it is contemplated that other circuits and logic gates may be combined to create the carry input for a three operand add, and/or provide the additional potential inputs of one or more of the operands, and/or a zero input to the adder 450.

Second part 442 of the second circuit 430 has two control inputs $C_5$, $C_6$, to the multiplexor 441. Varying the control inputs $C_5$, $C_6$ to the multiplexor 441 changes the various outputs $f_3(A,B,C)$, e.g., second partial result, generated by the second circuit 430. Table 6 below shows the various outputs $f_3(A,B,C)$, e.g., second partial result, which form the "carry" input into the adder 450. As can be seen by table 6, the second circuit 430 generates second partial result $f_3(A,B,C)$ which will be either a zero (0), operand B, operand C, or the carry-in (e.g., cry(A,B,C)) for the addition of operands A,B,C.

TABLE 6

| Control Inputs | | Output |
|---|---|---|
| $C_6$ | $C_5$ | $f_3(A, B, C)$ = carry |
| 0 | 0 | 0 |
| 0 | 1 | B |
| 1 | 0 | C |
| 1 | 1 | cry(A, B, C) |

Figure 7:
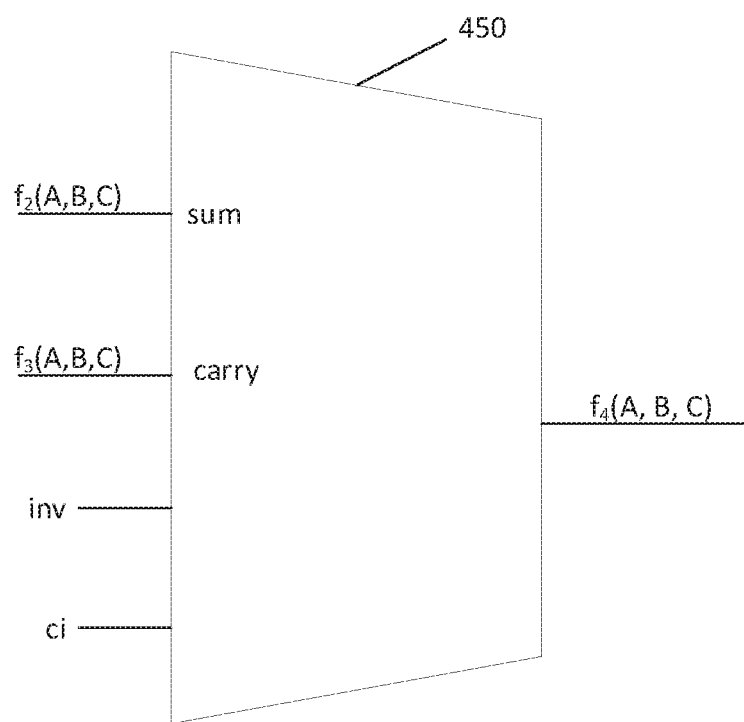
FIG. 7 is a block diagram of an embodiment of an adder for use in an ALU in an embodiment.

FIG. 7 shows the adder circuit or adder 450. Adder 450 in one embodiment may be a parallel prefix adder such as, for example, a Ladner-Fischer adder, a Kogge-Stone adder, a Brent-Kung adder, or a Han-Carlson adder. Other adders are also contemplated for adder 450 such as, for example, ripple carry adders, carry look-ahead adders, ripple-block carry look-ahead adders, block carry look-ahead adders, carry select adders, conditional sum adders, carry-skip adders, and carry save adders. In one embodiment, the adder 450 has as a first input the output $f_2(A,B,C)$ (e.g., first partial result) of the first logical circuit 410 and has as a second input the output $f_3(A,B,C)$ (e.g., second partial result) of the second circuit 430. In one embodiment, no further inputs are made to the adder 450.

As indicated earlier, the output $f_3(A,B,C)$ of the second circuit 430 is either a zero (0), B, C, or cry(A,B,C), and the output $f_4(A,B,C)$ of the adder 450 is shown in table 7A below for the four possible output variables $f_3(A,B,C)$ of the second circuit 430 (e.g., outputs 0, B, C, cry(A,B,C)). The result or output $f_4(A,B,C)$ of the adder 450 is the left middle column labeled zero (0) in table 7A, for the various inputs $f_2(A,B,C)$ from first logical circuit 410, when the second partial result $f_3(A,B,C)$ generated by the second circuit 430 that is input to the "carry" input of the adder is zero (0). The result or output $f_4(A,B,C)$ of the adder 450 is the middle column labeled B in table 7A, for the various inputs $f_2(A,B,C)$ from the first logical circuit 410, when the second partial result $f_3(A,B,C)$ generated by the second circuit 430 that is input to the adder 450 is B. The result or output $f_4(A,B,C)$ of the adder is the right middle column labeled C in table 7A, for the various inputs $f_2(A,B,C)$ from the first logical circuit 410, when the second partial result $f_3(A,B,C)$ generated by the second circuit 430 that is input to the adder 450 is C. And, the result or output $f_4(A,B,C)$ of the adder 450 is the far right column labeled cry(A,B,C) in Table 7A, for the various inputs $f_2(A,B,C)$ from the first logical circuit 410, when the second partial result $f_3(A,B,C)$ generated by the second circuit 430 that is input to the carry input of the adder 450 is cry(A,B,C). As can be seen in table 7A, the output $f_4(A,B,C)$ of the adder 450 when the cry(A,B,C) is selected by the second circuit 430 is a three operand A, B, C addition operation (A+B+C).

TABLE 7A

| $f_4(A, B, C) = f_2(A, B, C) + f_3(A, B, C)$; ci = 0, inv = 0 | | | | |
|---|---|---|---|---|
| Input from $f_2$ (A, B, C) | 0 | B | C | cry(A, B, C) |
| 0 | 0 | B | C | |
| −1 | −1 | B − 1 | C − 1 | |
| A | A | A + B | A + C | |
| B | B | B + B | B + C | |
| C | C | B + C | C + C | |
| not A | not A | B − A − 1 | C − A − 1 | |
| not B | not B | −1 | C − B − 1 | |
| not C | not C | B − C − 1 | −1 | |
| A \| B | A \| B | B + (A \| B) | C + (A \| B) | |
| A & B | A & B | B + (A & B) | C + (A & B) | |
| A ^ B | A ^ B | B + (A ^ B) | C + (A ^ B) | |
| not (A \| B) | not (A \| B) | B + not (A \| B) | C + not (A \| B) | |
| not (A & B) | not (A & B) | B + not (A & B) | C + not (A & B) | |
| not (A ^ B) | not (A ^ B) | B + not (A ^ B) | C + not (A ^ B) | |
| A & (not B) | A & (not B) | B + (A & (not B)) | C + (A & (not B)) | |
| (not A) \| B | (not A) \| B | B + ((not A) \| B | C + ((not A) \| B) | |
| A ^ C | A ^ C | B + (A ^ C) | C + (A ^ C) | |
| B ^ C | B ^ C | B + (B ^ C) | C + (B ^ C) | |
| not (A ^ C) | not (A ^ C) | B + not (A ^ C) | C + not (A ^ C) | |
| not (B ^ C) | not (B ^ C) | B + not (B ^ C) | C + not (B ^ C) | |
| (A \| B) ^ C | (A \| B) ^ C | | | |
| not (A & B) ^ C | not (A & B) ^ C | | | |
| A ^ B ^ C | A ^ B ^ C | | | A + B + C |
| (A & (not B)) ^ C | (A & (not B)) ^ C | | | |
| not (A \| B) ^ C | not (A \| B) ^ C | | | |
| (A & B) ^ C | (A & B) ^ C | | | |
| not (A ^ B ^ C) | not (A ^ B ^ C) | | | |
| ((not A) \| B) ^ C | ((not A) \| B) ^ C | | | |

The adder 450 performs its operations, functions and/or operations in a second stage of a single cycle of a processor of the ALU 400. In one embodiment, the operations and calculations of the adder 450 are performed in a second stage of the ALU in approximately 140 ps for sixty-four (64) bit operands. In one embodiment, the ALU 400 includes a first logical circuit 410 and a second circuit 430 which perform their operations in a first stage of a single cycle of a processor and the adder 450 performs its operations in a second stage of the same single cycle of the processor. In one embodiment, the ALU 400 with first logical circuit 410, second circuit 430 and adder 450 can execute two arithmetic operations or logic functions on three operands in a single cycle of the processor. The first logical circuit, the second circuit and the adder preferably perform their operation in about 180 ps for sixty-four (64) bit operands. In one aspect, the controls of the circuits 410, 430 and 450 can be set to form a three-way (3 operand) adder. To accomplish a three-way (3 operand) addition to get the output $f_4(A,B,C)$ of the adder 450 to be A+B+C, the control inputs $C_0$, $C_1$, $C_2$, $C_3$, $C_4$ of the first logical circuit 410 are set so that the output $f_2(A,B,C)$ of the first logical circuit 410 is A xor B xor C (A^B^C) and the output $f_3(A,B,C)$ of the second circuit is 430 is cry (A,B,C). In the example of the first logic circuit 410, the control inputs $C_4$, $C_3$, $C_2$, $C_1$, $C_0$ would be set at 01011 as shown in table 4.

To increase the functionality and operations to be performed by ALU 400, the adder 450 may include additional circuitry or controls associated with or as part of adder 450. For example, the adder 450 may also have a constant input function labeled "ci" which has the effect of adding an integer 1 to the output of the adder 450. The results of adder 450 for the three variable outputs 0, B, C of the second circuit 430 which are input into the "carry" input of the adder 450 are show in table 7B for when the constant in or "ci" input is set.

TABLE 7B $f_4(A, B, C) = f_2(A, B, C) + f_3(A, B, C) + 1$; ci = 1, inv = 0

| Input from $f_2$ (A, B, C) | 0 | B | C |
|---|---|---|---|
| 0 | 1 | B + 1 | C + 1 |
| −1 | 0 | B | C |
| A | A + 1 | A + B + 1 | A + C + 1 |
| B | B + 1 | B + B + 1 | B + C + 1 |
| C | C + 1 | B + C + 1 | C + C + 1 |
| not A | −A | B − A | C − A |
| not B | −B | 0 | C − B |
| not C | −C | B − C | 0 |
| A \| B | | | C − (not (A \| B)) |
| A & B | | | C − (not (A & B)) |
| A ^ B | | | C − (not A ^ B)) |
| not (A \| B) | | | C − (A \| B) |
| not (A & B) | | | C − (A & B) |
| not (A ^ B) | | | C − (A ^ B) |
| A & (not B) | | | C − ((not A) \| B |
| (not A) \| B | | | C − (A & (not B)) |
| A ^ C | | | |
| B ^ C | | | |
| not (A ^ C) | | | |
| not (B ^ C) | | | |
| (A \| B) ^ C | | | |
| not (A & B) ^ C | | | |
| A ^ B ^ C | | | |
| (A & (not B)) ^ C | | | |
| not (A \| B) ^ C | | | |
| (A & B) ^ C | | | |
| not (A ^ B ^ C) | | | |
| ((not A) \| B) ^ C | | | |

In another embodiment, the adder 450 may also have an inverse function labeled "inv", which has the function of logically inverting the output of adder 450. The results of the adder 450 for the three variable outputs zero (0), B, C of the second circuit 430 which are input into the "carry" input of the adder 450 are shown in table 7C for when the inverse or "inv" input (function) is set. When comparing the functions as illustrated in tables 7B and 7C, setting the "inv" function has the effect of multiplying the output of table 7B by a −1. It will be recognized that the various results generated and output by adder 450 when neither the "ci" input nor the "inv" input to the adder are set are shown in Table 7A.

TABLE 7C $f_4(A, B, C) = \text{not } (f_2(A, B, C) + f_3(A, B, C))$; ci = 0, inv = 1

| Input from $f_2$ (A, B, C) | 0 | B | C |
|---|---|---|---|
| 0 | 1 | −B − 1 | −C − 1 |
| −1 | 0 | −b | −C |
| A | not A | −A − B − 1 | −A − C − 1 |
| B | not B | −B − B − 1 | −B − C − 1 |
| C | not C | −B − C − 1 | −C − C − 1 |
| not A | A | A − B | A − C |
| not B | B | 0 | B − C |
| not C | C | C − B | 0 |
| A \| B | not (A B) | | (not (A \| B)) − C |
| A & B | not (A & B) | | (not (A & B)) − C |
| A ^ B | not (A ^ B) | | (not (A ^ B)) − C |
| not (A \| B) | A \| B | | (A \| B) − C |
| not (A & B) | A & B | | (A & B) − C |
| not (A ^ B) | A ^ B | | (A ^ B) − C |
| A & (not B) | (not A) \| B | | ((not A) \| B) − C |
| (not A) \| B | A & (not B) | | (A & (not B)) −C |
| A ^ C | not (A ^ C) | | |
| B ^ C | not (B ^ C) | | |
| not (A ^ C) | A ^ C | | |
| not (B ^ C) | B ^ C | | |
| (A \| B) ^ C | not (A \| B) ^ C | | |
| not (A & B) ^ C | (A & B) ^ C | | |
| A ^ B ^ C | not (A ^ B ^ C) | | |
| (A & (not B)) ^ C | ((not A) \| B) ^ C | | |
| not (A \| B) ^ C | (A \| B) ^ C | | |
| (A & B) ^ C | not (A & B) ^ C | | |
| not (A ^ B ^ C) | A ^ B ^ C | | |
| ((not A) \| B) ^ C | (A & (not B)) ^ C | | |

Figure 8:
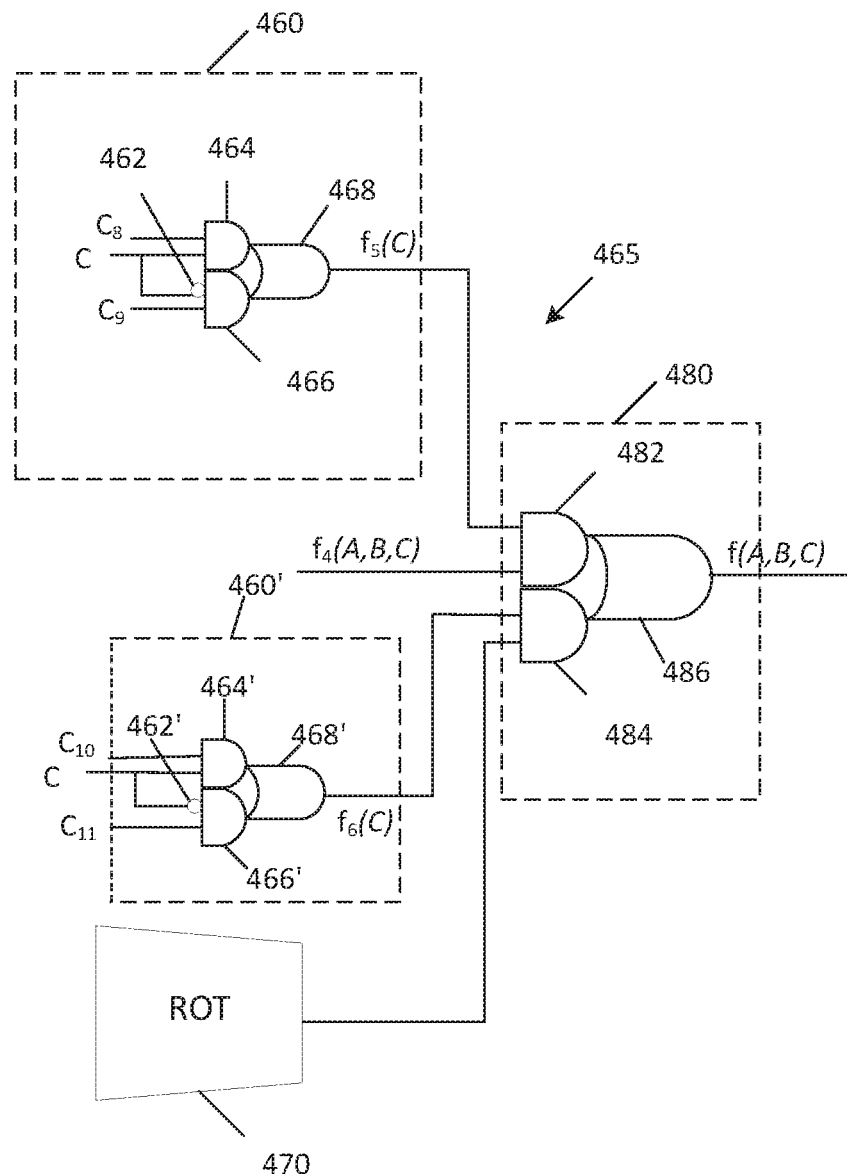
FIG. 8 is a schematic diagram of a backend circuit for an ALU according to one embodiment.

To provide additional functionality the ALU may optionally include a backend circuit 465 which preferably operates in the same single cycle as the first logical circuit 410, the second circuit 430, and the adder 450. The backend circuit preferably executes its operations and generates its results during a third stage of the single cycle of processor. As shown in FIG. 8, the backend circuit 465 in one embodiment preferably includes a rotator circuit 470, two operand circuits 460, 460' and a fusing circuit 480. The output of the first operand circuit 460 forms a first input to fusing circuit 480, the output of the adder 450 forms a second input to fusing circuit 480, the output of the second operand circuit 460' forms a third input to fusing circuit 480, and the output of the rotator 470 forms a fourth input to fusing circuit 480.

Both the first and second operand circuits 460, 460' are the same and include a plurality of logic gates, an operand input, and two control inputs. Each operand circuit 460, 460' includes one inverter, two AND gates, and one OR gate. While both operand circuits 460, 460' are the same, they can have different outputs by varying their control signals. In addition, while FIG. 8 shows, and the outputs of operand circuits 460, 460' are described with reference to operand C, it can be appreciated that different operand inputs may be used for operand circuits 460, 460', and that operand circuit 460 may have a different operand input (e.g., B) than operand circuit 460' (e.g., C). The operations and executions performed by operand circuits 460, 460' may be performed in the first or second stages of the clock cycle of the processor, and in one embodiment may be performed in parallel to the operations of the adder or the first logic circuit. Each output of the two AND gates 464, 466 are the two inputs to the OR gate 468 and the output $f_5(C)$ of the OR gate 468 is the input to fusing circuit 480. The operand, e.g., operand C, is an input to the first AND gate 464, and an input to the inverter 462. The output of the inverter 462 is an input to the second AND gate 466. A control input $C_8$ (ninth control input) is the second input to the first AND gate 464 and a control input $C_9$ (tenth control input) is the second input to the second AND gate 466. The second operand circuit 460' has the same configuration and logic gates as the first operand circuit 460, but has separate control inputs $C_{10}$, $C_{11}$ (eleventh and twelfth control inputs). The purpose of operand circuits 460, 460' is to generate and feed as an input to the fusing circuit 480 a zero (0), C, not C, or 1. Tables 8A and 8B show the control inputs and the resultant output $f_5(C)$, $f_6(C)$ for operand circuits 460, 460'.

TABLE 8A

| Control Inputs | | Output |
|---|---|---|
| $C_9$ | $C_8$ | $f_5(C)$ |
| 0 | 0 | 0 |
| 0 | 1 | C |
| 1 | 0 | not C |
| 1 | 1 | 1 |

TABLE 8B

| Control Inputs | | Outputs |
|---|---|---|
| $C_{11}$ | $C_{10}$ | $f_6(C)$ |
| 0 | 0 | 0 |
| 0 | 1 | C |
| 1 | 0 | not C |
| 1 | 1 | 1 |

A rotator circuit 470 may optionally be added as part of the backend circuit 465 to the ALU and permits a rotation function to be performed as well. In one aspect, the rotator can rotate an operand (64 bit operand for example) a specified number of bit positions to the left. Bits that exit from position 0 enter at position 63. The rotator circuit optionally is a place holder for additional functions that the arithmetic unit can perform.

The fusing circuit 480 in one embodiment includes a plurality of logic gates and acts similar to a multiplexor with four inputs and a single output f(A,B,C). The fusing circuit may be execute its operations in approximately 15 ps for sixty-four (64) bit operands. Fusing circuit 480 includes two AND gates 482, 484 and an OR gate 486, where each output of the two AND gates 482, 484 is an input to the OR gate 486, and the output of the OR gate 486 is the output f(A,B,C) of the fusing circuit 480 and the output of ALU 400. In one embodiment, the fusing circuit 480 may be set and configured such that the output $f_4(A,B,C)$ of the adder 450, which is also one of the inputs to the fusing circuit 480, is the output f(A,B,C) of the fusing circuit 480. In other words, the backend circuit 465 in one configuration may pass through the result (output $f_4(A,B,C)$) of the adder 450. The various output configurations f(A,B,C) for fusing circuit 480 is shown in table 9 below for the various control inputs $C_8$, $C_9$, $C_{10}$, $C_{11}$, where in certain examples the output f(A,B,C) is expressed as a function of the output $f_4(A,B,C)$ of the adder 450.

TABLE 9

| Control Inputs | | | | Output |
|---|---|---|---|---|
| $C_{11}$ | $C_{10}$ | $C_9$ | $C_8$ | f(A, B, C) |
| 0 | 0 | 0 | 0 | 0 |
| 0 | 0 | 0 | 1 | $f_4$(A, B, C) & C |

TABLE 9-continued

| Control Inputs | | | | Output |
|---|---|---|---|---|
| $C_{11}$ | $C_{10}$ | $C_9$ | $C_8$ | f(A, B, C) |
| 0 | 0 | 1 | 0 | $f_4$(A, B, C) & (not C) |
| 0 | 0 | 1 | 1 | $f_4$(A, B, C) |
| 0 | 1 | 0 | 0 | rot & C |
| 0 | 1 | 0 | 1 | illegal |
| 0 | 1 | 1 | 0 | Illegal |
| 0 | 1 | 1 | 1 | $f_4$(A, B, C) | C |
| 1 | 0 | 0 | 0 | rot & (not C) |
| 1 | 0 | 0 | 1 | illegal |
| 1 | 0 | 1 | 0 | illegal |
| 1 | 0 | 1 | 1 | $f_4$(A, B, C) | (not C) |
| 1 | 1 | 0 | 0 | rot |
| 1 | 1 | 0 | 1 | illegal |
| 1 | 1 | 1 | 0 | illegal |
| 1 | 1 | 1 | 1 | rot | $f_4$(A, B, C) |

ALU 400 is a general purpose 3-way ALU that can execute all combinations of add and logical instruction pairs simultaneously as fused instructions. In one embodiment, ALU 400 has configurable logic circuitry added to and in front of a regular parallel prefix adder, wherein the logic can be set to mimic the function of a 3:2 stage carry save adder to form a 3-way adder. The ALU 400 can be configured to perform the three-way add in a single cycle of the processor. The ALU preferably performs its operations including two instructions on three operands (sixty-four (64) bit operands) in approximately 200 ps or less, more preferably 195 ps or less. The ALU 400 can execute combinations of add and logical instruction pairs without a significant area increase on the semiconductor chip and without an increase in overall delay of the ALU that may require lowering the maximum frequency at which the ALU can operate. Numerous logical instructions can be executed with two or three operand inputs by selecting the value "0" for the carry input (e.g., the second circuit output $f_3(A,B,C)$) of the adder and setting the control bits of the first logical circuit to realize the desired logic function. To execute pairs of add+logical, the circuit can be configured to forward two operands into the adder, and the multiplexor-like structure at the adder output (e.g., the backend circuit) can be used to do an additional logic function with the adder output and the third operand. The logical unit in front of the adder can invert one operand for subtraction or can build a sum term for three-way addition (e.g., 3-way XOR). To do a three way sum, circuit 442 which functions similar to a multiplexor selects or through puts the carry input from the first part 432 (e.g., the output of the three-input OR gate 439) of the second circuit 432. For all other operations, the carry or output of the first part 432 of the second circuit 430 is not selected. If a two operand calculation or function is performed, the carry or output of the first part 432 of the second circuit 430 is not selected as an input to the adder.

Figure 9:
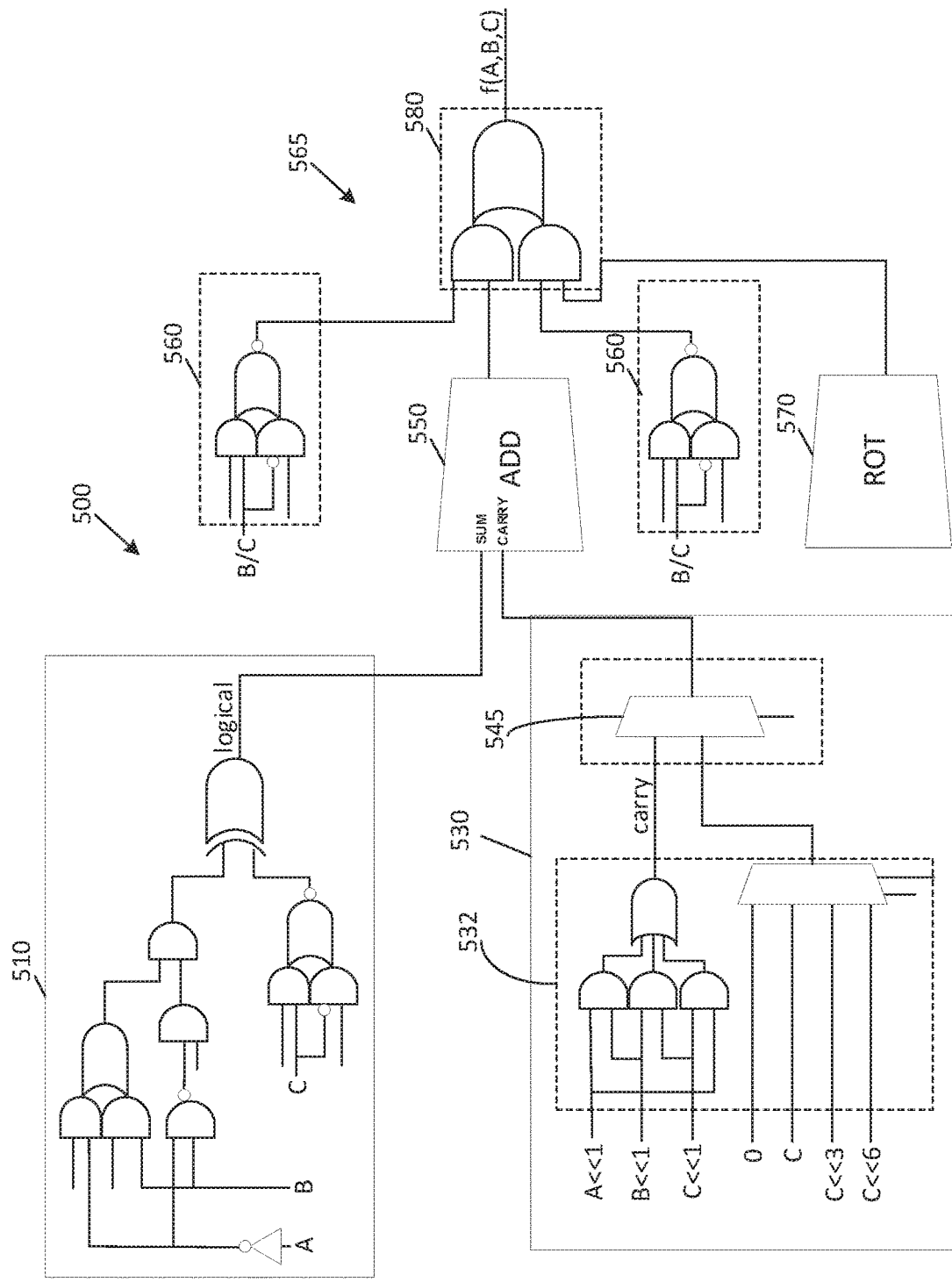
FIG. 9 is a block diagram of an ALU according to a different embodiment.

FIG. 9 shows another embodiment of an ALU circuit for executing combinations of add and logical instruction pairs simultaneously as fused instructions, including, for example, a three operand arithmetic operation or logic function (e.g., a three way addition) in a single cycle of a processor. ALU circuit 500 is similar to ALU 400 and includes a logical block in front of an adder. Referring to FIG. 9, circuit 510 is the same as circuit 410, adder 550 may be the same as adder 450 and may or may not have the optional inverse (Inv) or constant input (ci), and backend circuit 565 is the same as circuit 465. Circuit 530 in ALU 500 is similar to circuit 430 in ALU 400. In this regard, the first part 532 of the second circuit 530 that calculates the carry for an addition operation is the same as the first part 432 of the second circuit 430 in ALU 400. The multiplexor 541 in the second part 540 of the second circuit 530 is similar to the multiplexor 441 in the second part 440 of the second circuit 430 in ALU 400. The inputs to the multiplexor 541 are different from the inputs to the multiplexor 441 and is shown as operating as a 4:1 multiplexor. The third part 542 of the second circuit 530 is different from the third part 442 of the second circuit 430 in ALU 400. The third part 542 of the second circuit 530 includes a 2:1 multiplexor 545, which has two inputs and a single output based upon a single control input. The output of the second circuit 530 in ALU 500 is similar to the output of the second circuit 430 in ALU 400. In ALU 500, if a three (3) operand add is to be performed, the carry output from the first part 532 of the second circuit 530 is selected to be the output of the multiplexor 545, and for every other operation and function, the carry or output from the first part 532 of the second circuit 530 is not selected. If performing a two-operand operation, the carry output of the first part 532 of the second circuit 530 is not selected. As one skilled in the art would recognize, the combinations of arithmetic operations and logic functions possible with ALU 500 is similar to the arithmetic operations and logic functions possible with ALU 400.

Figure 10:
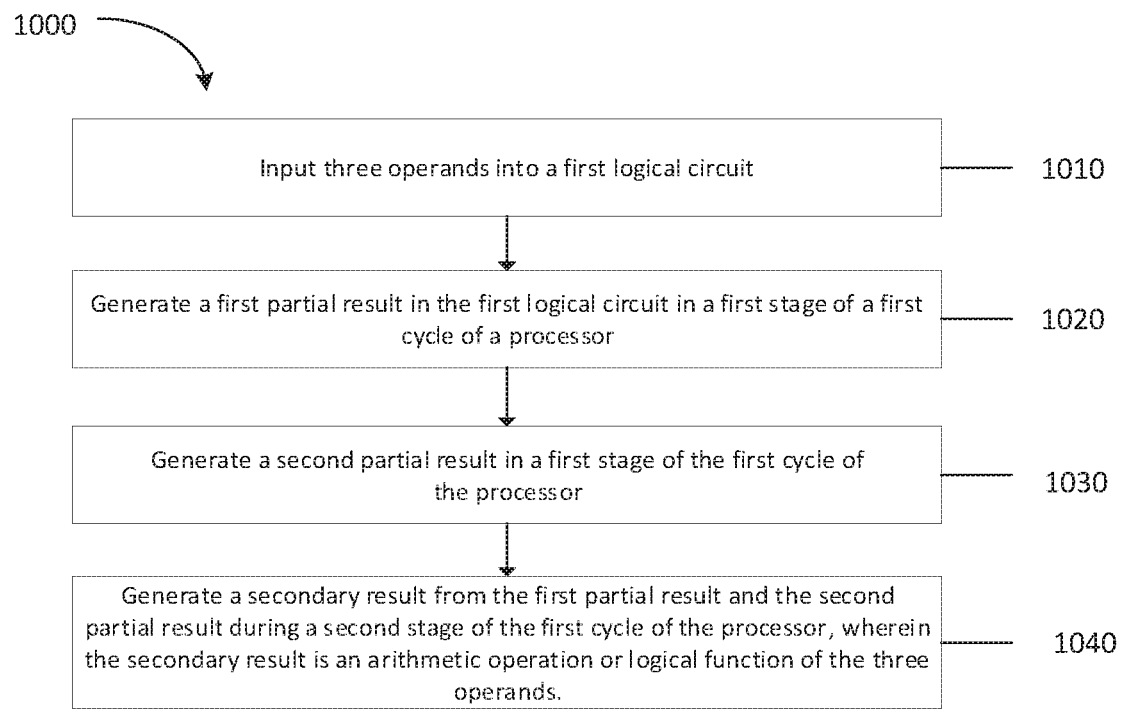
FIG. 10 is a flow chart of a method of performing a three-operand operation in a single cycle of a processor.

FIG. 10 illustrates an exemplary flowchart in accordance with one embodiment describing a method for performing fused instructions on three operands in a single cycle of a processor. While the method 1000 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 10, but the process may be integrated and/or one or more steps may be performed together, or the steps may be performed in the order disclosed or in an alternate order.

While the illustrative embodiments described above are preferably implemented in hardware, such as in functional units of a processor, various aspects of the illustrative embodiments may be implemented in software as well. For example, it will be understood that each block of the flowchart illustration in FIG. 10, and combinations of blocks in the flowchart illustration, can be implemented by computer program instructions. These computer program instructions may be provided to a processor or other programmable data processing apparatus to produce a machine, such that the instructions that execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems, which perform the specified functions or steps, or by combinations of special purpose hardware and computer instructions.

Referring to FIG. 10, the method 1000 of executing operations on three operands in a single cycle includes, in one aspect at 1010, inputting three operands, e.g., binary numbers A,B,C, into a first logical circuit. The first logical circuit may comprise a plurality of logic gates. In a second aspect, the method 1000, at 1020, includes, for example, generating a first partial result in the first logical circuit in a first stage of a first cycle of the processor. The method may include inputting two of the three operands (e.g., A,B) into a first part of the first logical circuit and performing logic and/or arithmetic operations with respect to the first and second operands to obtain a first part result, and inputting the third operand C into a second part of the first logical circuit and performing logic and/or arithmetic operations to obtain a second part result. In one embodiment, the first part result and the second part result of the first logical circuit may be input into an Exclusive OR (XOR) gate to obtain the first partial result.

In another aspect, the method 1000, at 1030, includes, for example, generating a second partial result in a first stage of the first cycle of the processor. Processes or steps 1020 and 1030 are preferably performed at or near the same time in the processor. The second partial result may be generated in a second circuit that includes logic gates and has as inputs one or more, and preferably at least two of operands A,B,C, or functions of operands A,B,C (e.g., A<<1, B<<1, C<<1). The method 1000 may including inputting one or more of operands A,B,C or functions of operands A,B,C into a second circuit to generate second partial result.

The method 1000 may also include, for example at 1040, generating a secondary result from the first partial result and the second partial result during a second stage of the first cycle of the processor. The secondary result is preferably an arithmetic operation or logical function of the three operands. In one embodiment, the secondary result is generated by inputting the first partial result and the second partial result as two operands into an adder. The adder preferably executes and performs its operations during a second stage of the same cycle of the processor as operations 1020 and 1030 are performed. In other words, preferably the first partial result, the second partial result, and the secondary result are generated during a single cycle of the processor.

In one aspect of method 1000, the arithmetic operation is a three operand (A,B,C) addition (A+B+C) performed in a single cycle of the processor. In one embodiment, the first partial result that is generated is the functional logic A^B^C (A xor B xor C). The second partial result that is generated may be a carry in that is calculated to determine whether carry (bits) are required. The functional logic A^B^C (A xor B xor C) and the carry-in may be input into an adder, for example, a parallel prefix adder. Optionally, method 1000 may include generating a final result by performing additional operations and functions with respect to the secondary result. The additional operations and functions are preferably performed during a third stage of the first cycle of the processor. For example, the first partial result, the second partial result, the secondary result, and the final result may all be performed during a single cycle of the processor. In one aspect, there may optionally be backend circuitry to perform the additional operations and functions, and preferably the backend circuit may be after the adder so that additional operations and functions may be performed on the output of the adder.

An arithmetic logic unit is disclosed that in one embodiment includes a first logical circuit that generates a first partial sum result from three operands in a first stage of a single clock cycle in a processor; a second circuit that generates a second partial result in the first stage of the clock cycle of the processor; and an adder that receives the first partial result from the first logical circuit and the second partial result from the second circuit and generates a secondary result during a second stage of the single clock cycle of the processor.

The first logic circuit preferably includes a first plurality of logic gates to receive the first and second operands, and a second plurality of logic gates to receive the third operand; the output of the first plurality of logic gates and the output of the second plurality of logic gates are two inputs to an Exclusive OR gate, wherein the output of the Exclusive OR is the first partial result received by the adder. The first plurality of logic gates of the first logic circuit may optionally include an inverter, two two-input OR gates, three AND gates and a NAND gate. The first logic circuit preferably is configured so that the output of the first and second AND gates are coupled as the two inputs of the first OR gate, and the output of the first OR gate is coupled as a first input to the third AND gate and the output of the NAND gate is connected as one input to the second OR gate and the output of the second OR gate is the second input to the third AND gate, and the output of the third AND gate is connected as the first input to the Exclusive OR gate. The first operand may be input to the inverter and the output of the inverter is a first input to the first AND gate and also a first input to the first NAND gate, and the second operand may be the first input to the second AND gate and the second input to the NAND gate, wherein the first AND gate includes a first control input, the second AND gate includes a second control input and the second OR gate includes a third control input where the first, second and third control inputs control the output of the third AND gate and the first input to the Exclusive OR gate.

The second plurality of logic gates of the first logic circuit may include an inverter, two AND gates and a NOR gate. The output of the two AND gates are the two inputs to the NOR gate and the output of the NOR gate is the second input to the Exclusive OR gate, wherein, the third operand is a first input to the first AND gate and is the input to the inverter, where the output of the Inverter is a first input to the second AND gate, and the first AND gate includes a fourth control input and the second AND gate includes a fifth control input wherein the fourth and fifth control inputs control the output of the NOR gate and the second input to the Exclusive OR gate. A plurality of control signals, including in one embodiment first, second, third, fourth and fifth control signals, control the function of the first logical circuit and the first partial result.

The second circuit may include a first part the calculates a carry-in sum and includes three AND gates and a three-input OR gate, wherein the output of each of the first, second and third AND gates forms the three inputs of the first OR gate and the output of the three-input OR gate calculates the carry-in sum, wherein a function of the first operand is a first input to both the first and third AND gates of the first part of the second circuit, a function of the second operand is the second input to the first AND gate and the first input to the second AND gate of the first part of the second circuit, and a function of the third operand is the second input to the second and third AND gates of the first part of the second circuit. The second circuit may optionally further include a second part comprising a fourth and a fifth AND gate whose outputs are the two inputs to the OR gate, and the output of the OR gate forms the second partial result that is input to the adder, wherein an output of a multiplexor forms a first input to the fifth AND gate and the output of the first part of the second circuit forms the first input to the fourth AND gate, wherein the fourth AND gate includes a sixth control input and the fifth AND gate includes an seventh control input, wherein the seventh and eighth control signals control the output of the two-input OR gate, the function of the second circuit and the second partial result. The multiplexor may be at least one of a 2:1 and 4:2 multiplexor that receives as at least one input, one of the three operands.

The arithmetic logic unit optionally includes an inverse control input to the adder and a constant in control input to the adder. In one embodiment, the arithmetic logic unit further includes a backend circuit used for additional logic function with the adder output, the backend circuit including a Rotator, two operand circuits and a fusing circuit wherein the output of the first operand circuit forms a first input to the fusing circuit, the output of the adder forms a second input to the fusing circuit, the output of the second operand circuit forms a third input to the fusing circuit, and the output of the Rotator forms a fourth input to the fusing circuit; further wherein: each operand circuit comprises an inverter, and two AND gates whose outputs are the two inputs to an OR gate, and the first input to the first AND gate is a first control signal, the second input to the first AND gate is the third operand, and the input to the inverter is the third operand with the output of the inverter forming the first input to the second AND gate, and the second input to the second AND gate is a second control signal; and the fusing circuit comprises two AND gates whose outputs are the two inputs to an OR gate, wherein the first and second inputs to the first AND gate of the fusing circuit are the output from the first operand circuit, and the output of the adder; and the first and second inputs of the second AND gate of the fusing circuit are the output of the second operand circuit and the output of the Rotator.

According to another embodiment, an arithmetic logic unit for executing arithmetic operations on three binary operands in a single stage of a cycle of a processor is disclosed, the arithmetic logic unit preferably, includes a first logic circuit for generating a first partial result in a first stage of a single clock cycle of a processor, the first logic circuit having a first part to receive two operands and having a second part to receive a third operand; a second logic circuit for generating a second partial result in the first stage of the same single clock cycle of the processor as the first logic circuit, the second logic circuit having a first part to generate a carry-in result for an addition operation and a second part to select a second part result that is a function of at least one of the operands, wherein the second partial result is at least one of the group consisting of the carry-in result and the second part result; an adder configured to receive the first partial result from the first logic circuit and the second partial result from the second logic circuit, and further configured to generate a secondary result during a second stage of the same single cycle that the first logic circuit and the second logic circuit generate the first partial result and the second partial result, respectively; and a backend circuit for generating a final result, wherein the backend circuit performs additional operations on the secondary result in a third stage of the same single cycle of the processor.

The arithmetic logic unit preferably is configurable to perform an addition operation on three operand (A,B,C) inputs during a single cycle of the processor, wherein the first logic circuit is configurable to generate a first partial result of A^B^C (A xor B xor C), and the second logic circuit is configurable to generate a second partial result that computes a carry-in bit, and the first partial result and second partial result are input to a parallel prefix adder to generate a secondary result of A+B+C. In one aspect, the first logic circuit is configured so that the output of first and second AND gates are the two inputs of a first OR gate, and the output of the first OR gate is a first input to a third AND gate and the output of a NAND gate is connected as one input to a second OR gate and the output of the second OR gate is the second input to the third AND gate, and the output of the third AND gate is connected as the first input to an Exclusive OR gate.

Also disclosed is a method of performing arithmetic operations in a computer processor, where the method includes inputting three operands into a first logical circuit; generating a first partial result in the first logical circuit in a first stage of a first cycle of the processor; generating a second partial result in a second circuit in the first stage of the first cycle of the processor; and generating a secondary result from the first partial result and the carry result during a second stage of the first cycle of the processor, wherein the secondary result is an arithmetic operation or logical function of the three operands. The method may also include inputting the first partial result and the second partial result into an adder during the second stage of the first cycle of the processor. In one aspect, the arithmetic operation is a three operand (A, B, C) addition performed in a single cycle of the processor, and the method optionally includes generating and inputting the functional logic A^B^C (A xor B xor C) as the first partial result into the adder; and selecting a carry-in result as the second partial result into the adder. The method may optionally further include generating a final result by performing additional operations and functions on the secondary result output by an adder during a third stage of the first cycle of the processor.

In an exemplary embodiment, where the ALU of FIGS. 4 and 9 are implemented in hardware, the methods described herein, such as process 1000 of FIG. 10, can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An arithmetic logic unit comprising:
a first logical circuit that generates a first partial result from three operands in a first stage of a single clock cycle;
a second circuit that generates a second partial result in the first stage of the clock cycle; and
an adder that receives the first partial result from the first logical circuit and the second partial result from the second circuit and generates a secondary result during a second stage of the single clock cycle,
wherein the first logic circuit comprises a first plurality of logic gates to receive the first and second operands, and a second plurality of logic gates to receive the third operand; the output of the first plurality of logic gates and the output of the second plurality of logic gates are two inputs to a third part of the first logic circuit, wherein the output of the third part of the first logic circuit is the first partial result received by the adder,
wherein the second plurality of logic gates of the first logic circuit includes an inverter, two AND gates and a NOR gate, and
wherein the third part of the first logic circuit comprises an Exclusive OR gate, and the output of the two AND gates are the two inputs to the NOR gate and the output of the NOR gate is the second input to the Exclusive OR gate, wherein, the third operand is a first input to the first AND gate and is the input to the inverter, where the output of the inverter is a first input to the second AND gate, and the first AND gate includes a fourth control input and the second AND gate includes a fifth control input wherein the fourth and the fifth control inputs control the output of the NOR gate and the second input to the Exclusive OR gate.

2. The arithmetic logic unit of claim 1, further comprising an inverse control input to the adder and a constant in control input to the adder.

3. The arithmetic logic unit of claim 1, wherein the first plurality of logic gates of the first logic circuit includes an inverter, two two-input OR gates, three AND gates and a NAND gate.

4. The arithmetic logic unit of claim 3, wherein the first logic circuit is configured so that the output of the first and second AND gates are coupled as the two inputs of the first OR gate, and the output of the first OR gate is coupled as a first input to the third AND gate and the output of the NAND gate is connected as one input to the second OR gate and the output of the second OR gate is the second input to the third AND gate, and the output of the third AND gate is connected as the first input to the third part of the first logic circuit.

5. The arithmetic logic unit of claim 4, wherein third part of the first logic circuit comprises an Exclusive OR gate, and the first operand is input to the inverter and the output of the inverter is a first input to the first AND gate and also a first input to the first NAND gate, and the second operand is the first input to the second AND gate and the second input to the NAND gate, wherein the first AND gate includes a first control input, the second AND gate includes a second control input and the second OR gate includes a third control input where the first, second and third control inputs control the output of the third AND gate and the first input to the Exclusive OR gate.

6. The arithmetic logic unit of claim 1, wherein first, second, and third control signals and the fourth and fifth control signals control the function of the first logical circuit and the first partial result.

7. The arithmetic logic unit of claim 1, wherein the second circuit comprises a first part that calculates a carry-in sum and includes three AND gates and a three-input OR gate, wherein the output of each of the first, second and third AND gates forms the three inputs of the first OR gate and the output of the three-input OR gate calculates the carry-in sum, wherein a function of the first operand is a first input to both the first and third AND gates of the first part of the second circuit, a function of the second operand is the second input to the first AND gate and the first input to the second AND gate of the first part of the second circuit, and a function of the third operand is the second input to the second and third AND gates of the first part of the second circuit.

8. The arithmetic logic unit of claim 7, wherein the second circuit further comprises a second part comprising a fourth and a fifth AND gate whose outputs are the two inputs to the OR gate, and the output of the OR gate forms the second partial result that is input to the adder, wherein an output of a multiplexor forms a first input to the fifth AND gate and the output of the first part of the second circuit forms the first input to the fourth AND gate, wherein the fourth AND gate includes a sixth control input and the fifth AND gate includes a seventh control input, wherein the seventh and eighth control signals control the output of the two-input OR gate, the function of the second circuit and the second partial result.

9. The arithmetic logic unit of claim 8, wherein the multiplexor is at least one of a 2:1 and 4:1 multiplexor that receives as at least one input one of the three operands.

10. The arithmetic logic unit of claim 1, further comprising a backend circuit used for additional logic function with the adder output, the backend circuit including a Rotator, two operand circuits and a fusing circuit wherein the output of the first operand circuit forms a first input to the fusing circuit, the output of the adder forms a second input to the fusing circuit, the output of the second operand circuit forms a third input to the fusing circuit, and the output of the Rotator forms a fourth input to the fusing circuit; further wherein:
  each operand circuit comprises an inverter, and two AND gates whose outputs are the two inputs to an OR gate, and the first input to the first AND gate is a first control signal, the second input to the first AND gate is the third operand, and the input to the inverter is the third operand with the output of the inverter forming the first input to the second AND gate, and the second input to the second AND gate is a second control signal; and
  the fusing circuit comprises two AND gates whose outputs are the two inputs to an OR gate, wherein the first and second inputs to the first AND gate of the fusing circuit are the output from the first operand circuit, and the output of the adder; and the first and second inputs of the second AND gate of the fusing circuit are the output of the second operand circuit and the output of the Rotator.

11. An arithmetic logic unit for executing arithmetic operations on three binary operands in a single stage of a cycle of a processor, the arithmetic logic unit comprising:
  a first logic circuit for generating a first partial result in a first stage of a single clock cycle of a processor, the first logic circuit having a first part to receive two operands and having a second part to receive a third operand;
  a second logic circuit for generating a second partial result in the first stage of the same single clock cycle of the processor as the first logic circuit, the second logic circuit having a first part to generate a carry-in result for an addition operation and a second part to select a second part result that is a function of at least one of the operands, wherein the second partial result is at least one of the group consisting of the carry-in result and the second part result;
  an adder configured to receive the first partial result from the first logic circuit and the second partial result from the second logic circuit, and further configured to generate a secondary result during a second stage of the same single cycle that the first logic circuit and the second logic circuit generate the first partial result and the second partial result, respectively; and
  a backend circuit for generating a final result, wherein the backend circuit performs additional operations on the secondary result in a third stage of the same single cycle of the processor,
  wherein the arithmetic logic unit is configurable to perform an addition operation on three operand (A,B,C) inputs during a single cycle of the processor, wherein the first logic circuit is configurable to generate a first partial result of A "B" C (A xor B xor C), and the second logic circuit is configurable to generate a second partial result that computes a carry-in bit, and the first partial result and second partial result are input to a parallel prefix adder to generate a secondary result of A+B+C.

12. The arithmetic logic unit of claim 11, wherein the first logic circuit is configured so that the output of first and second AND gates are the two inputs of a first OR gate, and the output of the first OR gate is a first input to a third AND gate and the output of a NAND gate is connected as one input to a second OR gate and the output of the second OR gate is the second input to the third AND gate, and the output of the third AND gate is connected as the first input to an Exclusive OR gate.

13. A method of performing a three operand (A, B, C) addition operation in a single cycle of a computer processor, said method comprising:
  inputting three operands into a first logical circuit;
  generating a first partial result in the first logical circuit in a first stage of a first cycle of the processor;
  generating a second partial result in a second circuit in the first stage of the first cycle of the processor;
  generating a secondary result from the first partial result and the carry result during a second stage of the first cycle of the processor, wherein the secondary result is an arithmetic operation or logical function of the three operands;
  inputting the first partial result and the second partial result into an adder during the second stage of the first cycle of the processor;
  inputting the functional logic A"B"C (A xor B xor C) as the first partial result into the adder; and
  selecting a carry-in result as the second partial result into the adder.

14. The method of claim 13, further comprising generating a final result by performing additional operations and functions on the secondary result output by an adder during a third stage of the first cycle of the processor.

\* \* \* \* \*